United States Patent [19]
Huggins et al.

[11] Patent Number: 5,927,523
[45] Date of Patent: Jul. 27, 1999

[54] RAIL CAR BUFFER

[75] Inventors: Russell J. Huggins, Wellsville; Julius I. Pershwitz, Grantham; Mark P. Scott, Boiling Springs, all of Pa.

[73] Assignee: Keystone Industries, Inc., Camp Hill, Pa.

[21] Appl. No.: 08/866,617

[22] Filed: May 30, 1997

[51] Int. Cl.⁶ ................................................. B61G 11/12
[52] U.S. Cl. ...................... 213/223; 188/287; 188/322.13
[58] Field of Search ................. 188/269, 282.7, 188/282.8, 287, 315, 317, 322.13, 322.15; 213/223, 43, 45; 267/219

[56]  References Cited

U.S. PATENT DOCUMENTS

| | | |
|---|---|---|
| 1,548,773 | 10/1925 | Ziebarth . |
| 1,772,414 | 8/1930 | Brooke-Hunt et al. . |

(List continued on next page.)

FOREIGN PATENT DOCUMENTS

| | | |
|---|---|---|
| 888878 | 12/1959 | Brazil . |
| 1189149 | 7/1968 | Brazil . |
| 0 021 698 | 1/1981 | European Pat. Off. . |
| 0 373 152 | 5/1986 | European Pat. Off. . |
| 225167 | 11/1986 | European Pat. Off. . |
| 0 260 968 | 9/1987 | European Pat. Off. . |
| 260968 | 9/1987 | European Pat. Off. . |
| 0 268 061 | 10/1987 | European Pat. Off. . |
| 451630 | 4/1990 | European Pat. Off. . |
| 453701 | 1/1991 | European Pat. Off. . |
| 0 451 630 A1 | 3/1991 | European Pat. Off. . |
| 518126 | 5/1991 | European Pat. Off. . |
| 0 518 126 A1 | 5/1992 | European Pat. Off. . |
| 0 595 160 | 10/1992 | European Pat. Off. . |
| 0 578 187 A1 | 7/1993 | European Pat. Off. . |
| 885386 | 9/1943 | France . |
| 1234184 | 5/1960 | France . |
| 2119735 | 12/1971 | France . |
| 2169485 | 8/1973 | France . |
| 2630466 | 4/1988 | France . |
| 555012 | 7/1932 | Germany . |
| 1530167 | 11/1965 | Germany . |
| 3738716 | 9/1988 | Germany . |
| 3921398 | 6/1989 | Germany . |
| 296 06 256 | 8/1996 | Germany . |
| 162266 | 9/1990 | Poland . |
| 167543 | 12/1992 | Poland . |
| 170036 | 4/1993 | Poland . |
| 170451 | 5/1993 | Poland . |
| 189102 | 10/1922 | United Kingdom . |
| 816089 | 7/1959 | United Kingdom . |
| 881194 | 11/1961 | United Kingdom . |
| 2027517 | 2/1980 | United Kingdom . |
| 2059005 | 4/1981 | United Kingdom . |
| 2261489 | 11/1991 | United Kingdom . |
| 2281114 | 2/1995 | United Kingdom . |
| 2312659 | 11/1997 | United Kingdom . |
| 89/02385 | 3/1989 | WIPO . |
| 90/15267 | 12/1990 | WIPO . |
| 93/12360 | 6/1993 | WIPO . |
| 93/15332 | 8/1993 | WIPO . |
| 95/00382 | 1/1995 | WIPO . |
| 95/20333 | 8/1995 | WIPO . |

OTHER PUBLICATIONS

"TecsPak Hydraulic Buffer for Reducing the Acceleration of Car Impacting" David G. Anderson, Proceedings of the ASME/IEEE Spring Joint Railroad Conference, Mar. 31–Apr. 2, 1992, pp. 69–74.

ETH Hydraulik–KombistoBdämpfer Kategorie C nach UIC 526–1 ETH 06.2100 (4 page pamphlet in German).

"Buffer gear for coaches", International Union of Railways, UIC Code 528 OR, 7$^{th}$ edition, Jan. 1, 1991, pp. 1–19.

"Wagons Buffers with a stroke of 105 mm", International Union of Railways, UIC Code 526–1 OR, 1$^{st}$ edition, Jan. 01, 1981 (Reprint, Jan. 11, 1991), pp. 1–31.

Primary Examiner—S. Joseph Morano
Attorney, Agent, or Firm—Thomas Hooker, P.C.

[57] ABSTRACT

A rail car buffer includes a standard capsule body and a high pressure hydraulic buffer spring only in the body. The hydraulic spring has a high compression ratio and is charged with very high pressure gas and hydraulic oil.

32 Claims, 5 Drawing Sheets

U.S. PATENT DOCUMENTS

| | | | |
|---|---|---|---|
| 2,332,161 | 10/1943 | McIntyre et al. | 188/315 |
| 2,486,741 | 11/1949 | Gabriel . | |
| 2,553,635 | 5/1951 | Dath . | |
| 2,670,814 | 3/1954 | Ball | 188/315 |
| 2,713,483 | 7/1955 | Tillou | 267/1 |
| 2,719,612 | 10/1955 | De Previnquieres | 188/88 |
| 2,985,319 | 5/1961 | Simmons | 213/45 |
| 3,040,907 | 6/1962 | Pelabon | 213/43 |
| 3,176,972 | 4/1965 | Deschner | 267/1 |
| 3,207,324 | 9/1965 | Blake | 213/8 |
| 3,307,842 | 3/1967 | Ellis, Jr. | 267/1 |
| 3,515,382 | 6/1970 | Gallagher | 267/1 |
| 3,554,387 | 1/1971 | Thornhill et al. | 213/223 |
| 3,596,774 | 8/1971 | MacCurdy | 213/8 |
| 3,605,960 | 9/1971 | Singer | 188/287 |
| 3,693,767 | 9/1972 | Johnson | 188/285 |
| 3,729,101 | 4/1973 | Brambilla et al. | 213/45 |
| 3,782,710 | 1/1974 | Selke et al. | 267/118 |
| 3,795,390 | 3/1974 | Kendall et al. | 267/33 |
| 3,819,219 | 6/1974 | Pamer | 293/88 |
| 3,826,481 | 7/1974 | Oeser | 267/152 |
| 3,840,097 | 10/1974 | Holley | 188/287 |
| 3,889,934 | 6/1975 | Kamman | 267/34 |
| 3,891,199 | 6/1975 | Willich et al. | 267/139 |
| 3,997,037 | 12/1976 | Schupner | 188/315 |
| 3,998,302 | 12/1976 | Schupner | 188/285 |
| 4,002,244 | 1/1977 | Matsumoto et al. | 213/43 |
| 4,026,418 | 5/1977 | Hawthorne | 213/8 |
| 4,026,533 | 5/1977 | Hennells | 267/124 |
| 4,040,523 | 8/1977 | Carle et al. | 213/46 |
| 4,057,129 | 11/1977 | Hennells | 188/285 |
| 4,059,175 | 11/1977 | Dressell, Jr. et al. | 188/285 |
| 4,076,225 | 2/1978 | Houghton | 267/34 |
| 4,198,037 | 4/1980 | Anderson | 267/153 |
| 4,482,035 | 11/1984 | Heideman et al. | 188/287 |
| 4,660,687 | 4/1987 | Williams et al. | 188/287 |
| 4,709,791 | 12/1987 | Houghton | 188/315 |
| 4,742,898 | 5/1988 | Lee | 188/287 |
| 4,805,517 | 2/1989 | Conley et al. | 92/8 |
| 5,025,938 | 6/1991 | Bomgardner et al. | 213/43 |
| 5,064,033 | 11/1991 | Koike et al. | 188/306 |
| 5,076,451 | 12/1991 | Conley et al. | 213/43 |
| 5,104,101 | 4/1992 | Anderson et al. | 267/219 |
| 5,160,123 | 11/1992 | Danieli | 267/226 |
| 5,178,240 | 1/1993 | Houghton | 188/315 |
| 5,234,084 | 8/1993 | Bell | 188/315 |
| 5,388,711 | 2/1995 | Hodges | 213/8 |
| 5,465,944 | 11/1995 | Page et al. | 267/217 |

RAIL CAR BUFFER

FIELD OF THE INVENTION

The invention relates to rail car cushioning devices, particularly rail car buffers, and related methods.

DESCRIPTION OF THE PRIOR ART

Rail car corner buffers conventionally include a collapsible capsule body surrounding a spring which resists collapse of the buffer. Buffers are mounted in pairs on the ends of rail cars for contact with buffers mounted on adjacent rail cars to protect the rail cars and lading from excessive forces during impacts, coupling, and normal train action events.

Buffers used in rail cars in European countries are required to meet standards established by the Union Internationale Chemins de Fer (International Union of Railways, (UIC)). The standards permit interchange of rail service between member countries. The UIC standards specify the physical dimensions of the buffer, the stroke of the buffer, the force-travel envelope for the buffer, the energy consumption requirements for the buffer and other characteristics of the buffer.

UIC performance standards for high energy absorption buffers have become ever more stringent. However, the physical size of the buffers has not changed. Some conventional high performance buffers use two spring elements to meet present UIC energy absorption and preload standards, a pressurized hydraulic spring and an elastomer spring, arranged in parallel. The hydraulic spring provides the required preload. The elastomer spring provides the required compression force at the end of the collapse stroke and enables the buffer to meet static closure requirements. Providing two springs in each buffer is expensive. The elastomer spring occupies valuable space in the capsule and limits the stroke of the buffer. Other conventional high pressure buffers use a hydraulic spring with hydraulic oil and pressurized gas but require separate chambers for the oil and gas. Some high pressure buffers use a compressible silicone fluid, which is difficult to seal in the buffer.

SUMMARY OF THE INVENTION

The invention is a reliable high performance rail car buffer capable of absorbing high energy impacts and meeting UIC standards during dynamic and static collapse. The buffer includes a single hydraulic spring mounted in a conventional capsule body. The spring is charged with very high pressure nitrogen gas and hydraulic oil and has a high compression ratio.

The very high pressure hydraulic fluid and the high compression ratio of the spring provide a high static compression force meeting all UIC standards.

The hydraulic spring has a piston which moves along a cylindrical wall during collapse and extension of the buffer. During collapse of the spring, hydraulic fluid is displaced from a chamber in front of the piston and flowed through a number of impact flow control orifices in the cylinder wall to cushion dynamic impacts. The flow control orifices are spaced along the cylinder wall. The number and spacing of the flow control orifices are adjusted as required to cushion anticipated dynamic impacts. After the piston has passed the impact flow control orifices, it travels along an imperforate length of the cylindrical wall and displaces hydraulic fluid from the chamber through a check valve. Initial extension of the hydraulic spring following both static and dynamic collapse is snubbed by throttling the flow of compressed, very high pressure hydraulic fluid back into the chamber in front of the piston and reducing the force extending the buffer. Snubbing occurs as the piston returns along the imperforate portion of the cylindrical wall, before the piston passes the flow control orifices in the wall to permit hydraulic fluid to flow through the orifices and into the chamber. Snubbed extension absorbs stored energy and improves the efficiency of the buffer. Snubbing is internal and occurs independent of a force applied to the buffer resisting extension. After initial snubbed extension and energy absorption, the piston rapidly returns to the extended position. During snubbing, impact energy stored in the buffer is efficiently converted to heat to reduce impact energy returned to the rail car.

The ratio of energy absorbed by the buffer to the total impact energy (Wa/We) for the buffer spring is greater than 50% during static closure tests conforming to UIC standards and may be as high as 90% for high speed dynamic impacts.

The buffer uses a single very high pressure, high compression ratio hydraulic spring to meet UIC standards. An elastomer spring is not used. Elimination of the elastomer spring means that the hydraulic spring occupies the entire length of the chamber inside the standard buffer capsule and has a stroke longer than the stroke of conventional buffer springs which include a hydraulic spring and an elastomer spring mounted in the standard chamber. Additional collapse stroke means that the spring can be designed to have a lower compression force for dynamic impacts operating over a longer distance to reduce impact forces and provide improved protection to rail car lading.

The hydraulic buffer spring includes a closed high yield strength steel housing with a piston rod extending outwardly from one end of the housing. A highly reliable high pressure seal is mounted in the housing and engages the piston rod to confine the very high pressure hydraulic fluid reliably within the housing during the long useful life of the buffer. The pressurized gas and hydraulic fluid within the housing are mixed together so that there is no need to confine the gas and hydraulic oil in separate variable volume chambers within the buffer or provide seals required for multiple chambers.

Elimination of the elastomer spring reduces the cost of the buffer and the risk of reduced performance because of elastomer degradation.

Other objects and features of the invention will become apparent as the description proceeds, especially when taken in conjunction with the accompanying drawings illustrating the invention, of which there are five sheets and two embodiments.

DESCRIPTION OF THE PREFERRED EMBODIMENT

Figure 1:
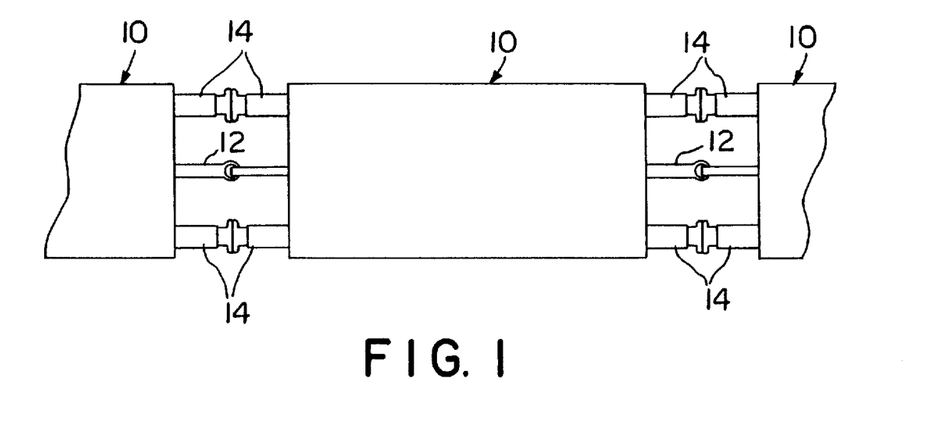
FIG. 1 is a top view of a number of rail cars with corner buffers joined by drawgear.

FIG. 1 illustrates three rail cars 10 joined together by drawgear 12 to form a train. Corner buffers 14 are mounted on the outer sides of the ends of cars 10 so that the contact heads of adjacent buffers normally engage each other. The buffers absorb and dissipate energy generated by impacts between rail cars during makeup of the train and by train action events, including acceleration and deceleration of the train, movement of the train around curves and the like.

Figure 2:
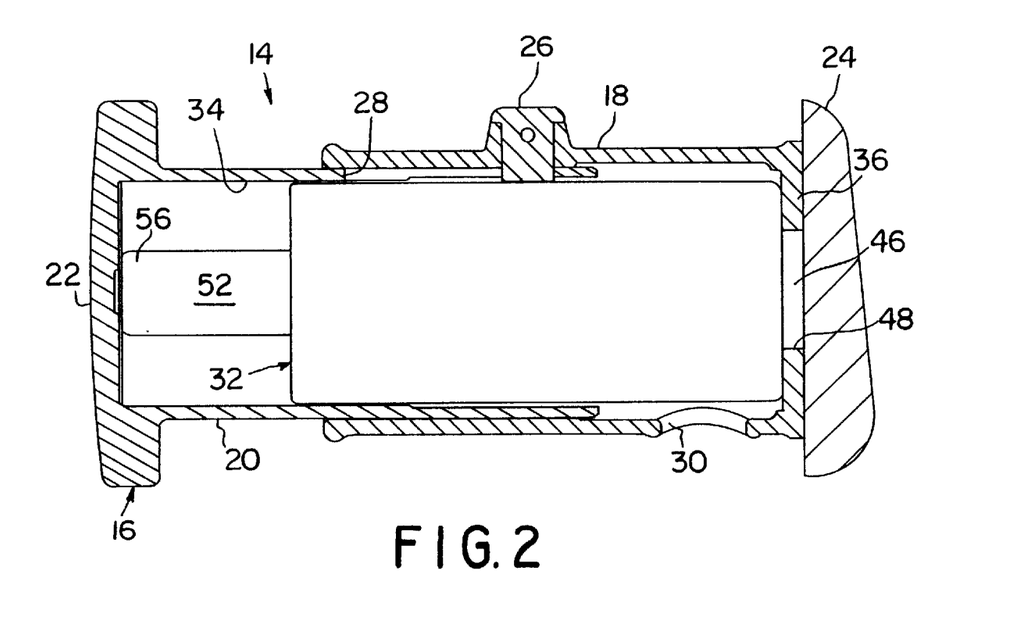
FIG. 2 is a partial sectional view taken through a corner buffer on a rail car.

As illustrated in FIG. 2, corner buffer 14 includes a capsule body 16 having a tubular base 18 and a tubular plunger 20 fitted inside the base. The passage includes an outwardly facing contact head 22 which normally engages the corresponding head of a buffer on an adjacent rail car. Base 18 is mounted on and extends outwardly from rail car end 24. The base and plunger are held together by key 26 mounted in an opening in the base and extending into an elongate slot 28 in the plunger. The key and slot connection permits the plunger to collapse into the base and expand to the extended position shown in FIG. 2 with key 26 engaging the inner end of slot 28. A drainage opening 30 is provided in the bottom of base 18.

Figure 3:
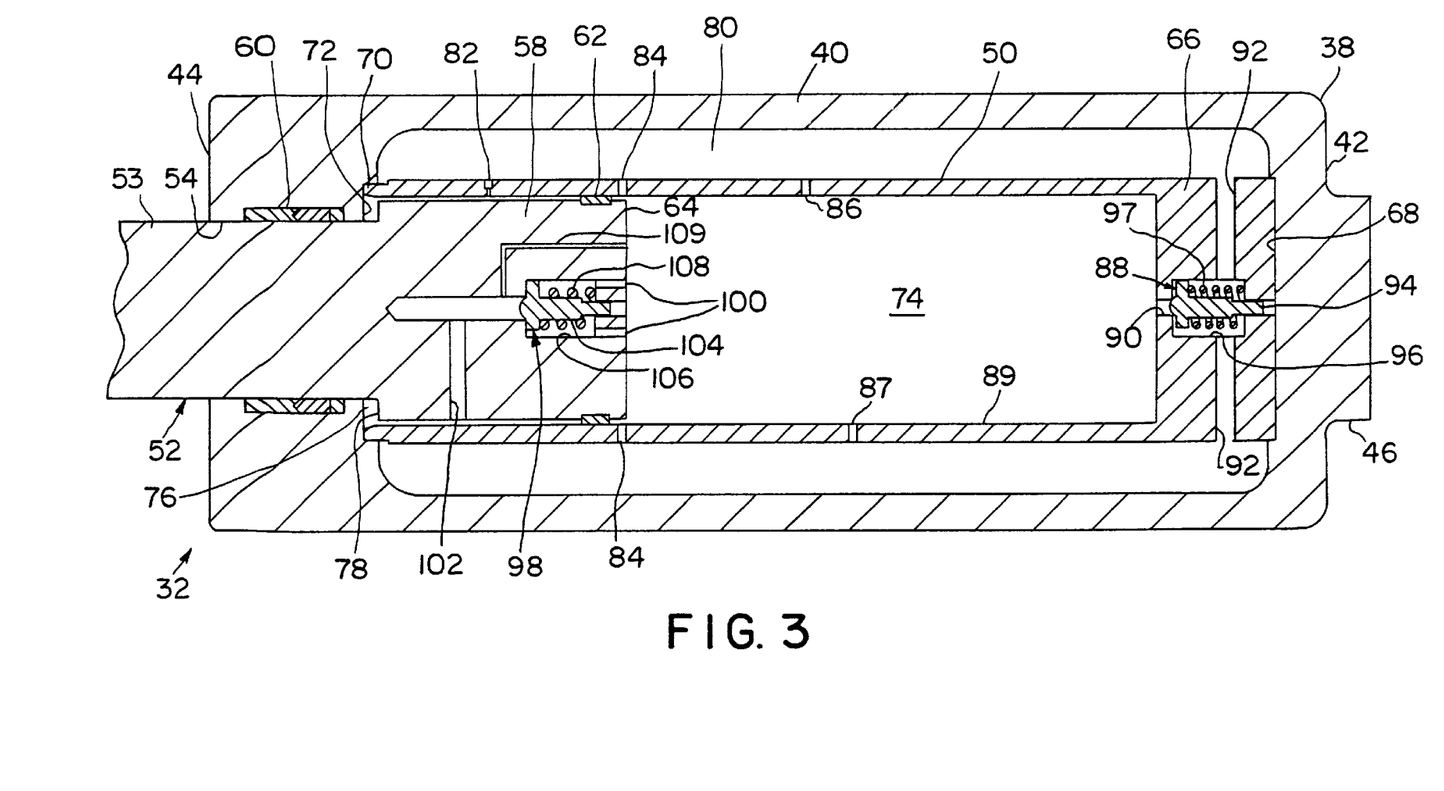
FIGS. 3–5 are sectional views taken through the spring of the corner buffer during collapse and extension.

Buffer spring 32 is fitted in cylindrical interior chamber 34 of capsule body 16 and extends between and engages base plate 36 and head 22. As shown in FIG. 3, buffer spring 32 is a gas charged hydraulic cylinder having a cylindrical body or housing 38 with an outer cylindrical wall 40, a front head 42 and a rear head 44. Cylindrical projection 46 on head 42 is seated in recess 48 in base plate 36. Cylindrical wall 50 is located inside body 38 and is surrounded by outer cylindrical wall 40. Walls 50 and 40 both extend between heads 42 and 44.

Piston 52 includes a rod 53 which extends through rod bore or passage 54 formed in rear head 44 with outer end 56 engaging contact head 22 and an enlarged head 58 located on the inner end of the piston inside wall 50. High pressure seal 60 in bore 54 engages the piston to prevent leakage of hydraulic fluid from body 38. A circumferential bearing and pressure seal 62 is provided on head 58 immediately adjacent piston front face 64 in order to support the piston in wall 50 and prevent flow of hydraulic fluid between the piston and the wall.

Wall 50 includes closed front end 66 which is seated in a recess 68 in front head 42. The open rear end 70 of wall 50 is seated in a recess 72 in rear head 44. Piston 58 divides the interior volume of cylindrical wall 50 into a cylindrical front chamber 74 located between the piston face 64 and end 66 and an annular rear chamber 76 surrounding rod 53 and located between annular piston rear face 78 and head 44. Chamber 74 extends past piston front face 64 to the front side of seal 62. Likewise, chamber 76 extends past piston rear face 78 along the piston to the rear side of seal 62. Outer cylindrical wall 40 and inner cylindrical wall 50 are spaced apart and define an elongate annular reservoir chamber 80 extending along the walls between heads 42 and 44.

A small diameter bleed aperture 82 extends through wall 50 adjacent rear head 44 and communicates chambers 76 and 80. Four orifices 84 (only two of which are illustrated) extend through wall 50. Orifices 84 are spaced 90° apart around the wall. The orifices 84 are all located at the same longitudinal position on wall 50 as illustrated in FIG. 3. When piston 52 is in the fully extended position shown in FIG. 3 orifices 84 are located immediately adjacent the front side of seal 62 and communicate chambers 74 and 80. During collapse of spring 32 initial movement of piston 52 toward front head 42 moves seal 62 past orifices 84 so that the orifices then communicate chambers 76 and 80.

Impact flow control orifices 86 and 87 extend through wall 50 between orifices 84 and end 66 at spaced longitudinal locations to communicate chamber 80 with either chamber 74 or chamber 76, depending upon the longitudinal position of the piston and seal 62 in the wall. If desired, additional impact flow control orifices may be provided to cushion rail car impacts.

Imperforate portion 89 of wall 50 extends from orifice 87 to front end 66. One-way impact check valve 88 is located at the front end of chamber 74 in front end 66 of wall 50 and communicates chamber 74 with chamber 80 through passage 90 opening into chamber 74 and passages 92 opening into chamber 80. Valve 88 includes a valve body 94 confined in chamber 96 located between passages 90 and 92. A spring 97 normally holds body 94 against a seat at the inner end of passage 90 to prevent flow of hydraulic fluid from chamber 80 past the valve and into chamber 74. During collapse of spring 32 the pressure of hydraulic fluid in chamber 74 is greater than the pressure of fluid in chamber 80 and moves body 94 away from the seat in passage 90 to open valve 88 and permit hydraulic fluid to flow out from chamber 74, past the valve and into chamber 80. Spring 97 holds valve 88 closed and prevents flow of hydraulic fluid into chamber 74 through passage 90 when the pressure in chamber 80 is greater than the pressure in chamber 74.

Pressure sensitive throttling valve 98 is mounted in the front end of piston head 58 and communicates chamber 76 with chamber 74 through passage 102 in the piston and passages 100 in the piston face. Passage 102 extends to the side of the piston rearwardly of seal 62. The valve 98 includes a throttling-type valve body 104 mounted in chamber 106 in the piston and engageable with a seat at the adjacent end of passage 102 to prevent outward flow of hydraulic fluid from chamber 74 to chamber 76. Spring 108 biases the body 104 away from chamber 74 and normally holds body 104 against the seat to close the valve. Spring 108 holds valve 98 closed until the pressure in chamber 76 is sufficiently greater than the pressure in chamber 74 to overcome the force of spring 108 and shift body 104 away from the seat. The valve cracks or starts to open when the pressure differential reaches a minimum cracking pressure, which may vary from 140.6 kgf/cm$^2$ to 281.2 kgf/cm$^2$ for buffers complying with UIC standards. Other strength springs may be used, if desired, so that valve 98 opens at other minimum pressure differentials. The valve opens when the pressure differential increases to the minimum and closes when the pressure differential falls below the minimum.

Valve 98 is sensitive to the pressure differential between the two chambers and moves the valve body 104 to increase and decrease the valve opening proportionally to the pressure differential and thereby vary or throttle the flow of fluid past the valve and into chamber 74 as a function of the pressure differential.

Small diameter bleed passage 109 is formed in piston head 58 and communicates passage 102 with front chamber 74. Passage 109 extends around the valve 98 to provide a continuous bleed connection between chamber 76 and front chamber 74. The passage 109 has a small diameter of 0.066 cm and a cross-sectional area of 0.003 cm$^2$. Passage 109 does not flow an appreciable volume of hydraulic fluid and does not affect normal operation of the buffer spring during static and dynamic collapse and extension.

Housing 38 fits snugly within chamber 34 and is manufactured from a high strength carbon steel alloy having a yield strength of about 827 MPA (Mega Pascals). Construction of the body from high yield strength material is required in order to prevent permanent deformation or rupture of the body by the high pressure hydraulic fluid confined within the body. The fluid is charged into the body at a high pressure. The pressure of the hydraulic fluid is increased during collapse of the buffer because of the high compression ratio.

Spring 32 is charged with hydraulic oil and pressurized gas prior to installation of the spring in capsule body 16. Hydraulic fluid and pressurized nitrogen gas are flowed into the interior volume of the housing through suitable filling ports. With the piston 52 fully extended against rear head 44, the interior chambers of the housing are first charged with sufficient hydraulic oil to completely fill chambers 74 and 76 inside wall 50 when the buffer spring is horizontal. The oil fills all of chamber 80 except for a space at the top of the spring. The passages in wall 50 assure that the chambers inside the wall are filled with hydraulic oil, independent of which side of the spring is up.

After the spring has been filled with hydraulic oil, very high pressure nitrogen gas is charged into the space above the hydraulic oil. Other gases may be used, if desired. The nitrogen gas has a charging pressure of about 147.6 kgf/cm$^2$. The gas pressurizes the oil in chamber 74 to hold the piston rod in the extended position with rear face 78 against rear head 44. The high pressure gas dissolves into the hydraulic oil until the oil becomes saturated. Dissolving of the gas into the hydraulic oil reduces the charging pressure from about 147.6 kgf/cm$^2$ to a settled pressure of about 133.6 kgf/cm$^2$.

After the buffer spring has been charged with hydraulic oil and very high pressure nitrogen gas, it is installed in the capsule body 16. During installation, the plunger is collapsed a short distance to move the piston rear face 78 from the rear head 44 and permit insertion of key 26 as shown in FIG. 2. The key limits extension of the spring. The assembled and pressurized buffer is then mounted on a rail car as shown in FIG. 1.

Figure 4:
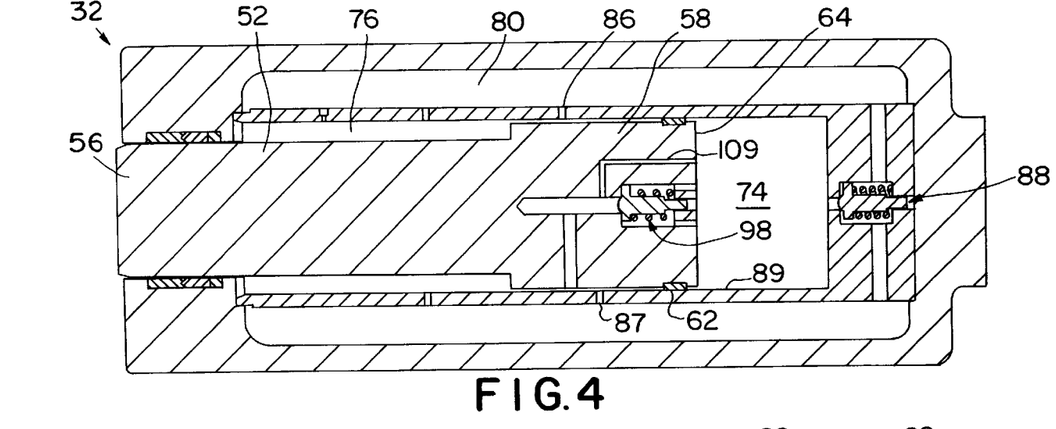
Figure 5:
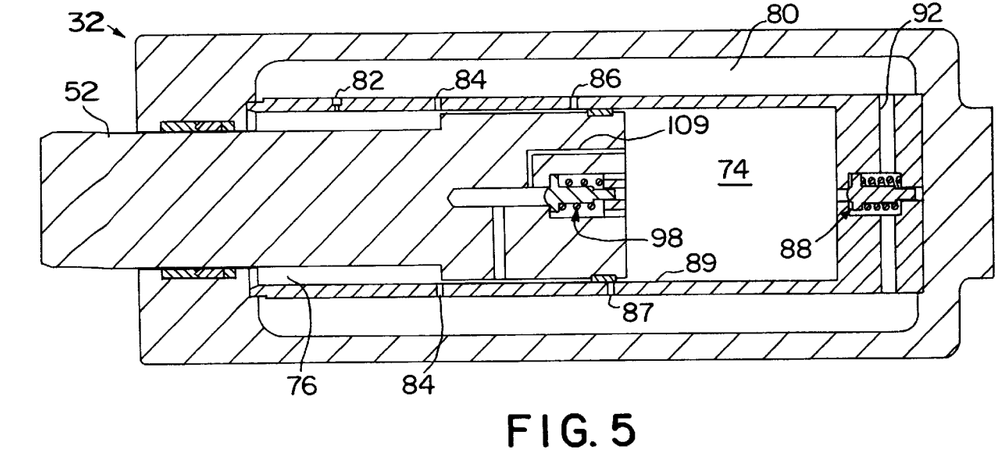
Figure 6:
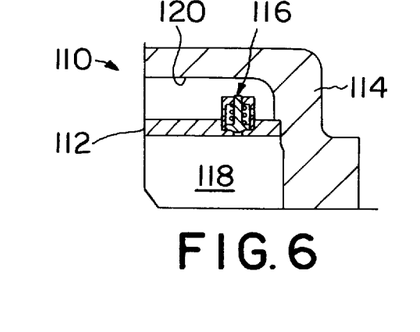
FIG. 6 is a broken away sectional view illustrating an alternative valve location.

In the embodiment shown in FIGS. 3–5, wall 50 is provided with a closed end 66 and impact check valve 88 is mounted in the closed end. FIG. 6 illustrates a portion of the front end of a buffer spring 110 which is like buffer spring 32 with the exception that the cylindrical wall 112 has an open front end which is seated in a recess in front head 114, in the same way the rear end of wall 50 is seated in rear head 44. An impact check valve 116, like valve 88, is mounted on the front end of wall 112 and communicates front chamber 118 with reservoir chamber 120 through an orifice in the wall. Valve 116 operates in the same way as valve 88 to permit the flow hydraulic fluid from chamber 118 to chamber 120 in response to impact movement of the piston toward the front head. Location of valve 116 in the front end of wall 112 permits elimination of the closed front head and increases the axial length of wall 112, thereby permitting increasing the length of the impact stroke of the piston to improve cushioning efficiency.

If desired, the throttling return valve 98 could be removed from the piston and mounted on wall 50 or in wall 112 between the front end of the wall and the front of seal 62 when the spring is fully collapsed. The return valve could also be mounted in the front end of wall 50, like valve 88.

Figure 7:
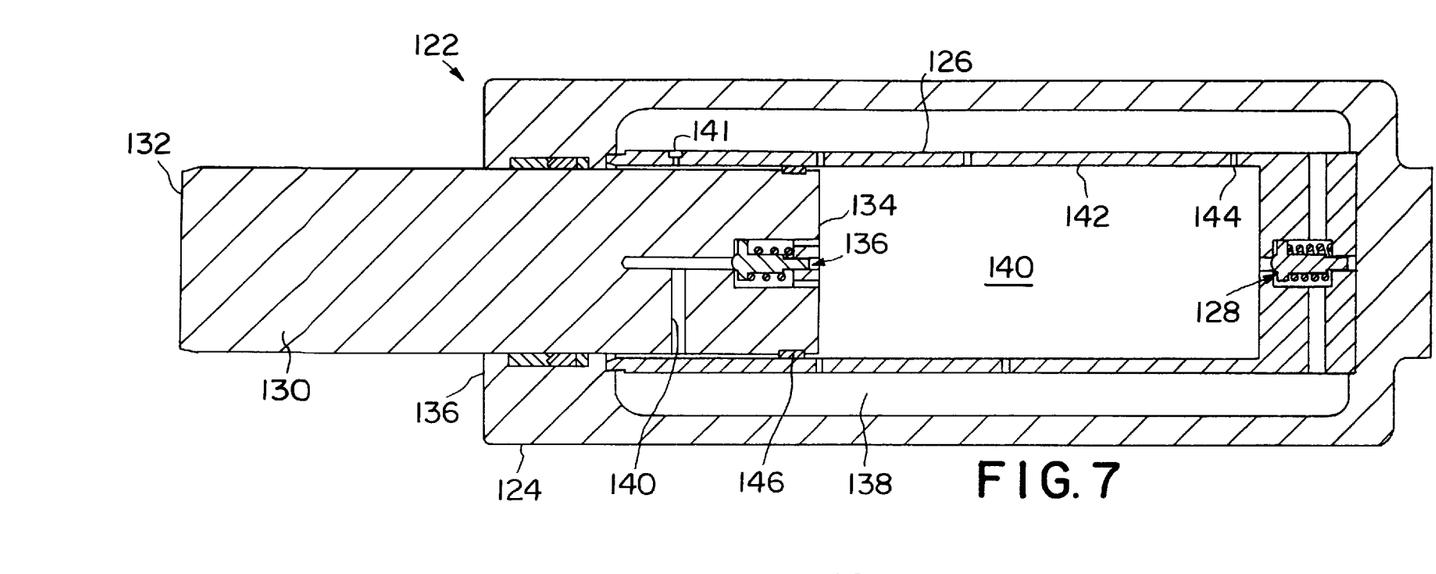
FIG. 7 is a view similar to FIG. 3 of a second embodiment spring.

FIG. 7 illustrates a second embodiment buffer spring 122 having a body 124 like body 38, and inner cylindrical wall 126 like wall 50 with an impact check valve 128 in the front end of wall 126, like valve 88. Piston 130 has a uniform diameter from free end 132 to front face 134. A return check valve 136, like valve 98, is provided in the front face of piston 130 and communicates outer cylindrical reservoir chamber 138 with front chamber 140 through the flow control orifices and a bleed aperture 141 in cylindrical wall 126 and bleed passage 144 in the front end of piston 130.

Wall 126 includes an imperforate portion 142, like portion 89. Aperture 141 opens into the space between the front end of the piston and the interior surface of wall 126. Bleed passage 144 extends through wall 126 adjacent the front end of chamber 140. Passage 144 provides bleed communication between chambers 138 and 140 and has a small diameter of 0.066 cm, like passage 109. During full collapse of spring 122 the seal 146 of piston 130 is moved toward the front end of the spring but does not close passage 144. The bleed passage 144 flows hydraulic fluid between chambers 138 and 140 slowly and does not affect normal collapse and extension of buffer spring 122. After the spring 122 has been charged with hydraulic oil and nitrogen gas, the spring is installed in capsule body 16, as described previously. Buffer spring 121 has essentially the same performance characteristics as buffer spring 32.

Figure 8:
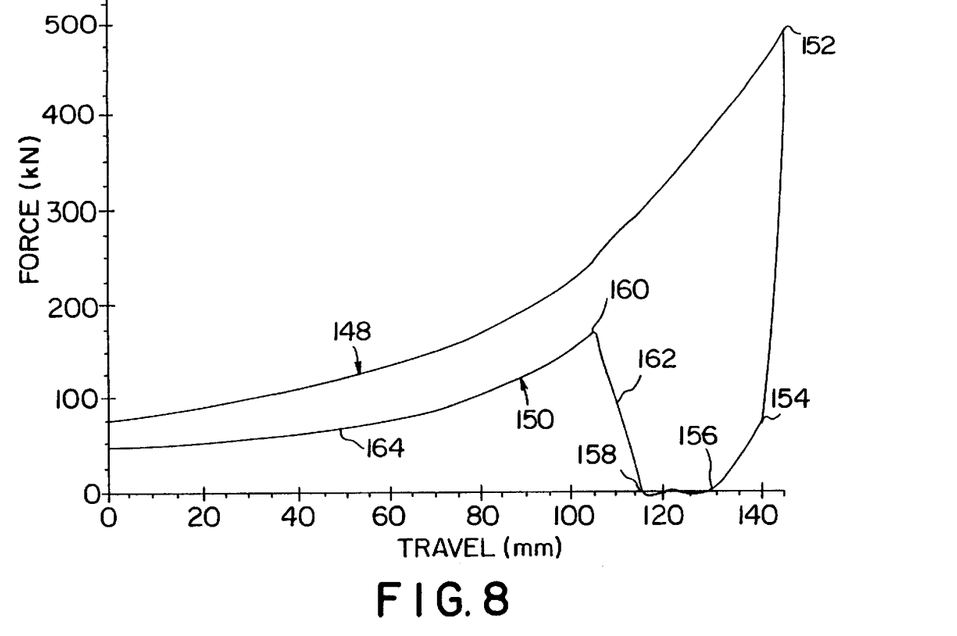
FIGS. 8 and 9 are graphs illustrating performance characteristics of the buffer.
Figure 9:
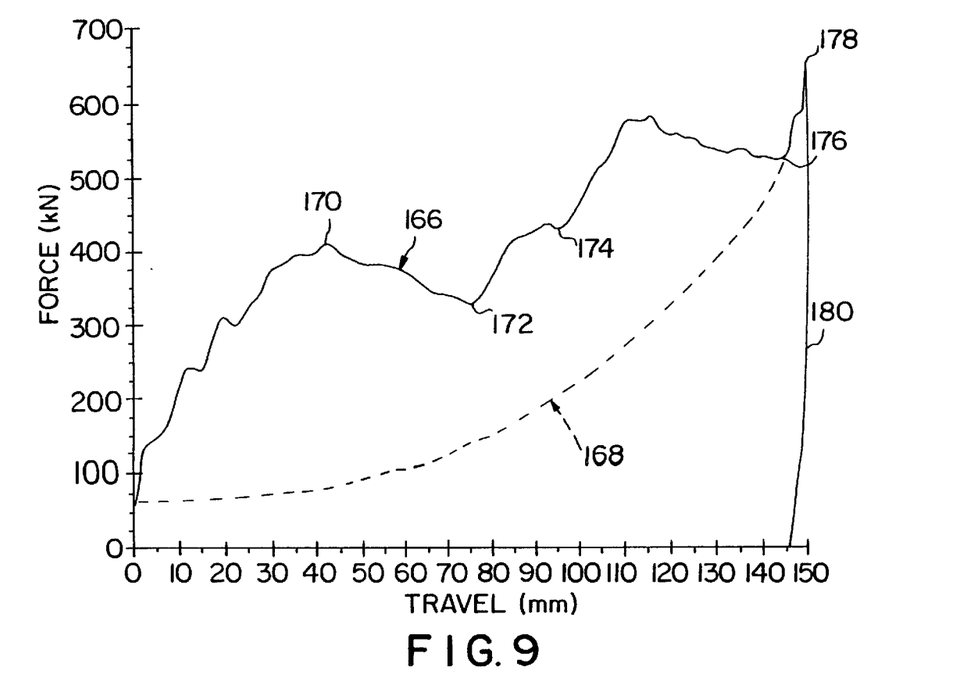

The FIGS. 8 and 9 graphs illustrate the performance characteristics of a corner buffer as illustrated in FIGS. 3–5 having a 150 mm stroke. During static collapse and extension at a rate of between 10 and 50 mm per second, the capsule complies with the UIC static closure standards and has a Wa/We ratio greater than 0.50. The Wa/We ratio is achieved by use of a high pressure compressible hydraulic fluid spring alone, without an elastomer spring.

The traces of the FIG. 8 graph show force v. distance for a buffer with a spring 32 as disclosed during static closure between faces of a press which are first collapsed 145 mm at the rate of 10 mm per second and then expanded or opened 145 mm at the same rate to return to the start position. The buffer compression and reaction forces are measured by a sensor positioned between the end of the piston 52 and one plate of the press. Trace 148 shows the total compression force exerted by the buffer spring during collapse. Trace 150 shows the reaction force exerted by the spring during extension from the 145 mm collapsed position back to the fully extended position. Slow static collapse of the spring at 10 mm per second flows hydraulic fluid in chamber 74 ahead of piston head 58 out of the chamber without substantial hydraulic resistance. FIG. 3 shows the spring extended. FIG. 4 shows the spring collapsed.

The pressurized hydraulic fluid in spring 32 exerts a preload force of 75.7 kN holding the buffer in the extended position, as indicated in FIG. 8 by trace 148 at the 0 mm position. During collapse piston 52 moves into the interior of body 32 and decreases the volume occupied by the hydraulic oil and gas mixture, thereby increasing the pressure of the mixture and the pressure exerted on the piston. Fluid flows freely out of chamber 74 through the flow control apertures during initial slow static collapse. After the piston passes aperture 87, valve 88 opens and hydraulic fluid flows out of the chamber through valve 88. The reduction in the volume of the fluid during collapse increases the compression force as shown by trace 148 to approximately 500 kN at peak 152 the end of the 145 mm collapse stroke. The 145 mm collapse stroke is slightly less than the maximum 150 mm collapse stroke for the spring. The spring has a compression ratio at full 150 mm collapse, as measured by the ratios of the pressures of the hydraulic fluid in the spring when extended and when collapsed, of about 6.2 so that the pressure of the hydraulic fluid when fully collapsed increases from the settled charging pressure of 133.6 kgf/cm$^2$ to about 828 kgf/cm$^2$. At this high pressure the hydraulic oil is reduced in volume about 4%. During collapse the volume of the hydraulic fluid is reduced 16%. Housing 38 is manufactured from strong alloy steel having a yield strength of 827 MPA, and is not permanently deformed or ruptured by the high pressure of the fluid when the buffer is collapsed.

At the end of the 145 mm static collapse stroke piston seal 62 has been moved past the flow control orifices and along imperforate wall portion 89. Front chamber 74 has a minimum volume and all the hydraulic fluid in spring 32 is at the same pressure. Valve 88 is closed, preventing flow of hydraulic fluid through the valve and into chamber 74. Valve 98 is held closed by spring 108 and prevents flow of hydraulic fluid into chamber 74. The plates of the press then reverse direction and open at the rate of 10 mm per second during the static extension stroke.

When the press starts to expand, the pressurized fluid in i5 closed chamber 74 exerts an outward force on piston face 64 greater than the force exerted on rear face 78 by fluid at the same pressure in chamber 76. The force differential extends the piston a short distance along imperforate wall portion 89. This short extension increases the volume of closed chamber 74, causes the pressure in chamber 74 to decrease below the pressure in chambers 76 and 80 and creates a pressure differential across valve 98. The decrease of pressure in chamber 74 reduces the outward pressure force exerted on the piston face and slows extension. The pressure differential across the valve increases as the volume of chamber 74 increases and the pressure in chamber 74 decreases below the pressure in chambers 76 and 80 until the differential equals the cracking pressure for the valve to overcome the force of spring 108 and open the throttling return check valve 98.

Opening of the valve allows hydraulic fluid to flow from chamber 76 through the valve and into chamber 74. This flow increases the pressure of the fluid in chamber 74 to decrease the pressure differential across the valve below the cracking pressure and close the valve. The flow of fluid into chamber 74 also increases the pressure in the chamber and increases the outward pressure force exerted on the piston face to extend the spring. During extension of the piston along imperforate wall portion 89, the valve 98 opens and closes to limit or throttle the flow of fluid into chamber 74, reduce the outward force exerted on the piston and slow or snub extension of the buffer spring.

During initial 5 mm extension of the buffer following full collapse, the reaction force of the spring rapidly decreases from 500 kN to about 75 kN at point 154 on trace 150 because extension is snubbed. The valve 98 flows fluid into chamber 74 to allow snubbed extension for 10 mm while reducing the reaction force to 0 kN at point 156. The throttled flow of hydraulic fluid into chamber 74 then slows the extension of spring to a rate less than 10 mm per second so that the spring expands slower than the press opens. This starts at point 156, about 130 mm along the collapse stroke and continues for about 15 mm.

At point 158, approximately 115 mm along the collapse stroke, the flow of hydraulic fluid into chamber 74 has increased the rate at which the spring expands, the spring catches up with the press plate and the reaction force then increases to 162 kN at point 152 located at about 105 mm along the collapse stroke. The reaction force increases from 0 kN at point 158 to about 167 kN at point 160 during extension of the spring. Trace portion 162 extending between points 158 and 160 has a negative slope indicating that the reaction force increases with extension of the piston due to reduction of snubbing and increase of outward pressure force exerted on the face of the piston.

At point 160 piston seal 62 passes across the first flow control orifice 87, the pressure differential across valve 98 is eliminated and hydraulic fluid flows into chamber 74 through one or more flow control apertures. During the remainder of the static extension stroke the hydraulic fluid in chamber 74 exerts a pressure force on the piston and extends the spring to the 0 mm position.

The reaction force of the buffer spring as the spring extends from 105 mm to 0 mm along the extension stroke is less than the compression force along the corresponding portion of the collapse stroke, as indicated by trace portion 164 being located beneath trace 148. This is because the frictional forces between the rod and seal 60, and between the seal 62 and wall 50 increase the compression force and reduce the reaction force. Additionally, during collapse of the spring, gas is dissolved into the hydraulic oil, thereby reducing the pressure during the extension stroke.

During static collapse and extension buffer 14 has a Wa/We ratio of more than 0.5, and meets UIC Wa/We standards. The buffer spring uses static collapse energy to pressurize the gas and oil. During static extension a large portion of the stored energy is converted to heat during snubbing. Static collapse energy is also converted directly to heat by friction during both collapse and extension of the buffer.

FIG. 9 is a force-travel curve illustrating the compression and reaction forces for a buffer 14 during collapse and extension due to a high speed impact between two rail cars. The graph was generated by using measurements taken from the head end of one of two buffers as disclosed mounted on a 90 metric ton rail car which was run against a stationary 80 metric ton rail car at a speed of 12.13 kph. The moving car impacted the stationary car, following which the stationary car rebounded from the moving car. In FIG. 9, trace 166 represents the total compression force of the buffer and is the sum of the static compression force indicated by trace 168, like static trace 148 in FIG. 8, and the dynamic compression force resulting from rapid flow of hydraulic fluid through flow orifices in the spring. The dynamic compression force is the vertical distance between traces 168 and 166.

Upon impact, and initial collapse of the buffer, the piston seal 62 immediately moves past the four distribution orifices 84. Further collapse of the buffer rapidly moves the piston toward front end 66 and flows hydraulic fluid out of chamber 74 through the flow orifices. The total compression force indicated by trace 166 rapidly increases above the preload compression force of the spring indicated by trace 168 due to the resistance to flow of hydraulic fluid out of chamber 74. The total compression force reaches a peak 170 at approximately 40 mm of travel and then decreases to low point 172 at about 75 mm of travel, where seal 62 passes over flow orifice 86 to reduce the cross sectional area of the passages flowing hydraulic fluid out of chamber 74 and correspondingly increase the compression force due to hydraulic resistence. Likewise, the seal 62 passes over and closes orifice 87 at low point 174 to again increase the hydraulic resistence. During further collapse, fluid flows from chamber 74 past open valve 88. Hydraulic resistance is generated until the speed of collapse slows and the hydraulic component of the compression force falls to zero at point 176. During the short remainder of the compression stroke, the compression force follows trace 168 to a peak 178 of about 650 kN at the very end of the stroke. The two cars then rebound from each other and the reaction force of the buffer, as indicated by trace 180, rapidly falls to zero.

FIG. 4 illustrates the buffer spring 32 immediately prior to rebound of the rail cars. Piston 52 has moved a distance along imperforate wall portion 89 and is instantaneously motionless in wall 50 and the hydraulic fluid in chamber 74 is at the same pressure as the hydraulic fluid in chamber 80.

Valves 88 and 98 are closed. The pressurized fluid in chamber 74 exerts an outward pressure force on the piston which then extends along portion 89 a short distance and decreases the pressure in chamber 74. The decrease in pressure slows extension and generates a pressure differential across valve 98 which then opens to throttle flow of hydraulic fluid into chamber and snub extension, as previously described.

The pressure sensitive valve 98 continuously adjusts the flow of hydraulic fluid into chamber 74 based on the pressure differential across the valve and snubs return of the piston along portion 89, allowing a slow, snubbed extension of the buffer despite the absence of a force exerted on the end of piston 52 resisting extension. Snubbed free extension of the buffer spring 32 continues as the seal 62 moves along portion 89 until the seal passes over orifice 87 and permits free flow of hydraulic fluid from chamber 80 into chamber 74.

After aperture 87 is opened, the pressure of the fluid in chamber 74 extends the piston until seal 62 passes orifice 84 and chamber 76 is communicated with chamber 80 through bleed aperture 82 only. Flow through this aperture is limited and slows final extension as the buffer returns to the fully extended position of FIGS. 2 and 3.

During free return or extension of the collapsed buffer the throttled flow of hydraulic fluid into chamber 74 slows the rate of extension of spring to between 5 and 15 mm per second for the first 115 mm of extension until seal 62 opens orifice 87. After orifice 87 has been opened and hydraulic fluid flows freely from chamber 80 into chamber 74, the rate of extension of the spring is between 100 and 300 mm per second until the end of the extension stroke when seal 62 passes orifices 84 and extension is slowed by flow through bleed aperture 82.

Buffer spring 32 efficiently absorbs high dynamic impact energy. For some impacts, the Wa/We ratio of the buffer is as high as 90%. Buffer spring 122 shown in FIG. 7 operates like buffer spring 32 as previously described.

During initial collapse of buffer spring 32 hydraulic fluid is flowed out of chamber 74 through the impact flow control orifices 86 and 87. Depending upon the strength of spring 97 in valve 88, the valve may open and flow hydraulic fluid out of chamber 74 before the piston seal 62 passes the forward orifice 87 and moves onto the imperforate wall portion 89. Movement of the piston into cahmber 96 increases the pressure in the chamber to overcome the force of spring 97 and open valve 88 during the remainder of the collapsed stroke.

Buffer 32 is illustrated as having two spaced flow control orifices 86 and 87. Other buffers may have a larger number of flow control orifices in wall 50 in order to generate a dynamic compression force for the spring different than that indicated by the vertical difference between traces 166 and 168 in FIG. 9. In such case, it may be desirable to provide a relatively stiff spring 97 in order to assure that valve 88 remains closed until seal 62 has crossed all of the control orifices.

Extension of the collapsed buffer spring 32 along imperforate wall portion 89 requires that the pressure differential across valve 98 increase to the cracking pressure of the valve in order to open the valve and allow hydraulic fluid to flow into chamber 74. In order to generate the pressure differential it is necessary that the hydraulic fluid in the reservoir chamber have a high pressure. Leakage of hydraulic fluid from the buffer or very low ambient temperature may decrease the pressure of the fluid in the reservoir chamber sufficiently that the cracking pressure differential is not achieved and the valve 88 does not open. In this event, the buffer spring cannot expand as described.

Small diameter bleed passage 109 extends around valve 108 and provides a continuous bleed communication between chambers 80 and 74. In the event the pressure differential between the chambers is insufficient to open valve 98, a very small volume of hydraulic fluid continuously bleeds from higher pressure chamber 80 into chamber 74 in order to increase the pressure in chamber 74 and allow extension of the buffer spring at a very slow rate. Hydraulic fluid bleeds from chamber 80 into chamber 74 until the piston is extended sufficiently to open the first flow control orifice in wall 50, following which the buffer extends as previously described until it is fully extended and is in position to receive and absorb another impact.

Bleed passage 144 in buffer 122 is located in the portion of imperforate wall 142 adjacent the front head. Piston seal 146 does not cross passage 144. The passage 144 permits slow extension of the spring in the event the pressure differential between chambers 138 and 140 do not reach the cracking pressure.

The disclosed bleed passages have very small cross-sectional areas, and allow slow flow of very small volumes of hydraulic fluid. This flow does not affect the performance characteristics of buffer springs 32 or 122 during collapse and extension, even though the bleed passage may be located in the imperforate portion of the cylindrical wall.

The bleed passage assures a bleed flow of hydraulic fluid into the front chamber when the piston seal has crossed all of the flow control orifices. In order to assure bleed flow of hydraulic fluid into the collapsed front chamber, the passage must open into the chamber when the piston has been fully collapsed, however the location of the passage is not critical. The passage may open into the chamber through the piston, as illustrated in FIG. 3, may open into the chamber through the cylindrical wall, as illustrated in FIG. 7 or may open into the chamber through the wall at the front end of the chamber.

While we have illustrated and described preferred embodiments of our invention, it is understood that these are capable of modification, and we therefore do not wish to be limited to the precise details set forth, but desire to avail ourselves of such changes and alterations as fall within the purview of the following claims.

What we claim as our invention is:

1. A rail car buffer comprising;
   A) a capsule body including a tubular base having a plate at one end of the buffer and a tubular plunger having a contact member at the other end of the buffer, said base and plunger being fitted together to define a generally cylindrical interior chamber extending between the plate and contact member; and
   B) a gas filled hydraulic spring in the interior chamber, said hydraulic spring including a housing with opposed front and rear heads and a cylindrical wall extending between the heads, a piston in the cylindrical wall engaging the interior of the cylindrical wall, a piston rod joined to the piston and extending outwardly of the housing through a rod passage in the rear head to an outer rod end, said hydraulic spring extending between said plate and said contact member, a front chamber in the housing between the piston and the front head, an outer wall surrounding said cylindrical wall and extending between the heads; a reservoir chamber between said outer and cylindrical walls; hydraulic fluid including hydraulic oil and pressurized gas in said chambers, a one way valve communicating the front chamber with the reservoir chamber, said one way valve located to permit flow of hydraulic fluid out from the front chamber and prevent flow of hydraulic fluid into the front chamber, a pressure sensitive throttling valve including a moveable valve body and a valve spring biasing the valve body away from the front chamber, said pressure sensitive valve communicating the reservoir chamber and front chamber, and at least one impact flow control orifice in the cylindrical wall spaced away from the front head, said cylindrical wall including an imperforate portion located adjacent the front head.

2. A rail car buffer as in claim 1 wherein the gas filled hydraulic spring is the sole impact energy absorbing member in the interior chamber.

3. A rail car buffer as in claim 1 including a bleed passage opening into the front chamber and communicating the front chamber and another chamber.

4. A rail car buffer as in claim 3 wherein said bleed passage has a cross section of about 0.003 cm$^2$.

5. A railcar buffer comprising;
   A) a capsule body including a tubular base having a plate at one end of the buffer and a tubular plunger having a contact member at the other end of the buffer, said base and plunger being fitted together to define a generally cylindrical interior chamber extending between the plate and contact member; and
   B) a gas filled hydraulic spring in the interior chamber, said hydraulic spring including a housing with opposed front and rear heads and a cylindrical wall extending between the heads, a piston in the cylindrical wall engaging the interior of the cylindrical wall, a piston rod joined to the piston and extending outwardly of the housing through a rod passage in the rear head to an outer rod end, said front head engaging one of said plate and said contact member, and said rod end engaging the other of said plate and contact member; a front chamber in the housing between the piston and the front head, an outer wall surrounding said cylindrical wall and extending between the heads; a reservoir chamber between said outer and cylindrical walls; hydraulic fluid including hydraulic oil and pressurized gas in said chambers, a first valve communicating the front chamber with the reservoir chamber, said first valve permitting flow of hydraulic fluid out from the front chamber and preventing flow of hydraulic fluid into the front chamber; a second valve communicating the reservoir chamber and front chamber, said second valve permitting throttled flow of hydraulic fluid into the front chamber and preventing flow of hydraulic fluid into the reservoir chamber; and at least one impact flow control orifice in the cylindrical wall spaced away from the front head, said cylindrical wall including an imperforate portion located adjacent the front head.

6. A rail car buffer as in claim 5 wherein said piston includes a piston seal engaging the cylindrical wall, said at least one impact flow control orifice being located between the piston seal and the front head when the buffer is fully extended, and said piston seal being located adjacent the front head and engaging said imperforate portion of the cylindrical wall when the buffer is fully collapsed.

7. A rail car buffer as in claim 6 wherein one of said valves is located adjacent the front end of the housing.

8. A rail car buffer as in claim 6 wherein one of said valves is located in the piston.

9. A rail car buffer as in claim 6 wherein each said valve is located either adjacent the front end of the housing or in the piston.

10. A rail car buffer as in claim 9 wherein said hydraulic fluid has a settled pressure of about 133.6 kgf/cm$^2$.

11. A rail car buffer as in claim 10 wherein said hydraulic spring has a compression ratio of about 6.2.

12. A rail car buffer as in claim 9 wherein said hydraulic fluid has a pressure of about 828 kgf/cm$^2$ when the buffer is collapsed.

13. A rail car buffer as in claim 12 having a collapse stroke of about 150 mm.

14. A rail car buffer as in claim 13 wherein said housing is made from material having a yield strength of not less than about 827 MPA.

15. A rail car buffer as in claim 6 wherein said second valve has a cracking pressure of between about 140.6 kgf/cm$^2$ and about 281.2 kgf/cm$^2$.

16. A rail car buffer as in claim 6 including a bleed passage communicating the resevior chamber and the front chamber.

17. A rail car buffer as in claim 16 wherein said bleed passage has a cross-section of about 0.003 cm$^2$.

18. A rail car buffer as in claim 3 wherein said piston includes a rear face and the hydraulic spring includes a rear chamber in the cylindrical wall extending between the rear face of the piston and the rear head.

19. A rail car buffer as in claim 18 wherein said second valve is located in the piston and opens into the rear chamber.

20. A rail car cushioning device comprising a gas filled hydraulic spring having a housing with opposed front and rear heads and a cylindrical wall extending between the heads, a piston in the cylindrical wall, said piston having a front face and an end extending outwardly of the housing through a piston passage in the rear head, a front chamber in the cylindrical wall, said front face forming one wall of the front chamber, a reservoir chamber in the housing, hydraulic fluid including hydraulic oil and pressurized gas in said chambers, one or more impact flow control orifices in the cylindrical wall communicating the said chambers, said orifices being located a distance away from the front head, and an imperforate portion of the cylindrical wall adjacent the front head, a one-way valve communicating the front chamber and the reservoir chamber, said one-way valve permitting flow of hydraulic fluid from the front chamber into the reservoir chamber while preventing flow of hydraulic fluid from the reservoir chamber into the front chamber, and a pressure sensitive valve communicating the reservoir chamber and the front chamber, said pressure sensitive valve preventing flow of hydraulic fluid from the front chamber into the reservoir chamber while permitting flow of hydraulic fluid from the reservoir chamber into the front chamber when the pressure of the hydraulic fluid in the front chamber is less than the pressure of the hydraulic fluid in the reservoir chamber.

21. A rail car cushioning device as in claim 20 wherein the chamber surrounds the cylindrical wall.

22. A rail car cushioning device as in claim 20 wherein the the pressure sensitive valve starts to open when the pressure of the hydraulic fluid in the front chamber is less than the pressure of the hydraulic fluid in the reservoir chamber by an amount ranging from about 140.6 kgf/cm$^2$ to about 281.2 kgf/cm$^2$.

23. A rail car cushioning device as in claim 20 wherein the compression ratio for the hydraulic spring is about 6.2.

24. A rail car cushioning device as in claim 23 wherein the settled pressure of the hydraulic fluid is about 133.6 kgf/cm$^2$ when the spring is extended.

25. A rail car cushioning device as in claim 24 wherein the hydraulic spring has a preload of about 75.7 kN when extended.

26. A rail car cushioning device as in claim 20 including a bleed passage communicating the reservoir and front chambers when the piston is fully collapsed into the housing.

27. A rail car cushioning device as in claim 20 wherein one of said valves is located in the piston.

28. A rail car cushioning device as in claim 20 wherein one of said valves is located adjacent the front head of said housing.

29. A rail car cushioning device as in claim 28 wherein the other of said valves is located in said piston.

30. A rail car cushioning device as in claim 20 including a piston seal extending around the piston and engaging the cylindrical wall, said piston seal crossing all of said one or more flow control orifices and moving along the imperforate portion of the cylindrical wall during collapse of the spring.

31. A rail car cushioning device as in claim 30 including a bleed passage communicating the reservoir chamber and the front chamber when the piston is fully collapsed into the housing.

32. A rail car buffer as in claim 31 wherein said bleed passage has a cross section of about $0.003$ $cm^2$.

* * * * *

UNITED STATES PATENT AND TRADEMARK OFFICE
CERTIFICATE OF CORRECTION

PATENT NO. : 5,927,523
DATED : July 27, 1999
INVENTOR(S) : Huggins et al.

It is certified that error appears in the above-identified patent and that said Letters Patent is hereby corrected as shown below:

Cover page, [56] References Cited, under U.S. PATENT DOCUMENTS, insert after the last line the following lines:
--3,110,367  11/12/1963  Roberts        188/96--
--3,301,410  1/31/1967   Seay           213/43--
--4,043,545  8/23/1977   Dial et al.    267/116--
--4,078,638  3/14/1978   Koyama et al.  188/288--
--5,415,303  5/16/1995   Hodges et al.  213/43--
--5,487,480  1/30/1996   Page et al.    213/43--

Under FOREIGN PATENT DOCUMENTS, lines 1 and 2 replace "Brazil" with --United Kingdom--; insert after the last line the following lines:
--528,242     6/11/1931   Germany--
--528,569     7/1/1931    Germany--

In the Specification
    Column 3, line 9, following "inside the base. The" change "passage" to --plunger--.
    Column 9, line 45, following "Movement of the piston into" change "cahmber" to "chamber".

In the Claims
    Claim 16, line 2, change "resevior" to --reservoir--.
    Claim 18, line 1, change "3" to --6--.
    Claim 21, line 1, following "wherein the" insert --reservoir--.
    Claim 22, line 1, delete "the".

Signed and Sealed this

Fourth Day of January, 2000

*Attest:*

*Attesting Officer*

*Acting Commissioner of Patents and Trademarks*